Sept. 25, 1962    J. D. BALL ETAL    3,056,105
CONTINUOUS CALIBRATION OF SEISMIC VELOCITY LOGGERS
Filed May 9, 1960    2 Sheets-Sheet 1

INVENTORS.
JOHN D. BALL,
CHARLES J. CHARSKE,
BY    Frank S. Troidl
ATTORNEY.

United States Patent Office 3,056,105
Patented Sept. 25, 1962

3,056,105
CONTINUOUS CALIBRATION OF SEISMIC
VELOCITY LOGGERS
John D. Ball and Charles J. Charske, Houston, Tex., assignors, by mesne assignments, to Jersey Production Research Company, Tulsa, Okla., a corporation of Delaware
Filed May 9, 1960, Ser. No. 27,643
3 Claims. (Cl. 340—18)

This invention relates to geophysical prospecting. More particularly, this invention relates to a method and apparatus for measuring the velocity of acoustic pulses through subsurface formations traversed by a borehole.

In continuous velocity logging, a housing, suspended by a cable, is lowered down a borehole. A source of sound and at least one sound detector vertically spaced from the source of sound is included within the housing along with the required electronic circuits. If a two detector system is used, the pulses emitted from the sound source are detected first by the detector closer to the source of sound and then by the detector further away from the source of sound. The time, $\Delta t$, it takes for the sound to travel from the closer detector to the further detector is indicated by a record obtained at the earth's surface.

These continuous seismic velocity logging tools are extremely sensitive to temperature changes and changes in resistance of the suspending cable. Any change in conditions may cause the electronic systems to become inaccurate.

In the past, it has been the practice to calibrate the instrument prior to running the tool into the well, and on occasion, again calibrate the tool after the tool has been removed from the well. Recently, the seismic velocity logging tool has come in great demand because of its value as a geological correlation device. If the accuracy of the device is maintained, the instrument is also useful for geophysical interpretation. It is now routine operation for field personnel to operate these highly complicated logging tools. The field personnel do not always observe the correct calibration procedure or keep the equipment in a state of good repair.

From the foregoing, it is obvious that a logging tool including a means for continuously calibrating the tool as it is being used in the borehole is highly desirable. Our new method and seismic velocity logging tool includes such a system. Our new method provides a calibration of the logger which is continuous and presented upon the log upon which the $\Delta t$ information is recorded. The monitoring at the surface allows adjustments by the operator to keep scale factors constant and at the same time is indicative of instrument malfunction.

The continuous velocity logger makes use of an intermittent sound source such that a number of separate sonic pulses are emitted for each foot of borehole and their travel times individually measured, the number of pulses being emitted being dependent upon the desired definition and the maximum well logging speed. The rate normally used is of the order of 10 per second for logging speeds of 100 feet per minute or less. The time required for emitting a sound pulse and performing a travel time measurement is a millisecond or less. The relatively long interval between sonic measurements is adequate to provide a calibration measurement between sonic measurements. This is accomplished by supplying a standard pulse spacing obtained from an oscillator, such as a crystal oscillator, to the circuits normally used to measure the time difference in arrival of the sonic pulse. The resulting signal then travels to the surface over the same conductor used for the sonic measurement. Since this signal is "time shared" with the sonic measurement, it is possible to separate the two at the surface.

In carrying out our new method of calibrating a velocity logging tool, substantially the same circuit is used for the calibration sequence as in the velocity logging sequence. A signal of constant amplitude is fed to an electrical signal storage means in response to a first calibrate pulse. This constant amplitude signal which is fed to the storage means is terminated in response to another calibrate pulse of known time relation to the first calibrate pulse. Thus, the magnitude of the signal stored by the storage means is proportional to the difference in time between the calibrate pulses. The magnitude of the signal stored in the storage means is recorded on the log.

The velocity logging sequence and calibration sequence are alternately performed. Any variation from an expected magnitude of storage signal during the calibration sequence indicates a variation of the timing and output circuits since the crystal controlled oscillator is known to be extremely stable.

The invention as well as its many advantages will be further understood by reference to the following detailed description and drawings in which.

Figure 1:
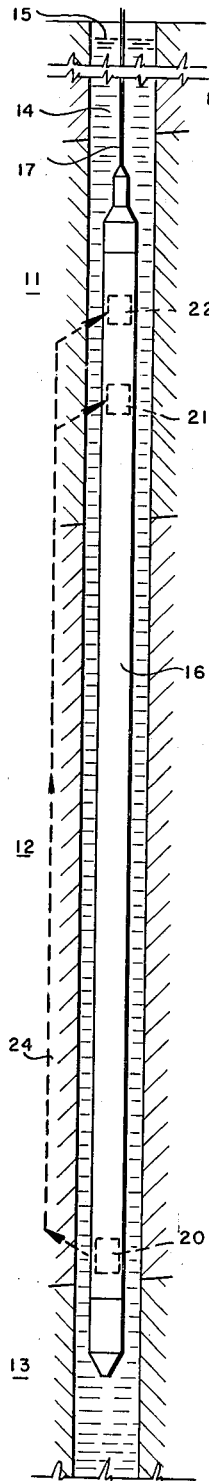
FIG. 1 is a view showing the logging tool suspended in a borehole and illustrating the approximate positions of the sound source and detectors.

Referring to FIG. 1 of the drawings, there is illustrated a sectional view of a portion of the earth's crust made up of a plurality of different lithologic strata, or formations, such as 10, 11, 12, and 13, which are traversed by a well or borehole 14. Usually, the well 14 is filled with water, mud, or other drilling fluids whose upper surface is indicated at 15. Within well 14 there is shown an elongated probe or body, designated generally by the numeral 16, which may be moved freely within a well suspended on a cable 17.

As will be understood by workers in the art, the cable 17 may include one or more flexible steel strands of adequate strength to carry safely the weight of the probe 16. Also, cable 17 will include a plurality of insulated conductors adapted to conduct electrical power from a power source located at the surface to certain elements carried by probe 16, and also adapted to conduct from other elements within probe 16 an electrical signal which may be continuously recorded by a recording means on the earth's surface as the probe is moved along the well bore.

Further, the record produced by the recording means may be continuously correlated with the depth of the probe 16 in the well; a measuring wheel may be provided adjacent the mouth of the well and used in a manner well understood in the well logging art.

In the preferred embodiment of our invention, the probe 16 includes a sound source 20, a first sound detector 21, and a second sound detector 22. The detectors 21 and 22 are spaced in a common direction vertically from the sound source 20. The first sonic energy to arrive at each of detectors 21 and 22 follows the shortest time path from the sound source 20 through surrounding mud or water in the borehole to the wall of the borehole, then through the earth formations forming said wall, and then to the detector devices through the mud surrounding them. This path is represented schematically by the broken line 24 in FIG. 1.

It can be shown mathematically that the $\Delta t$, i.e., the difference in time it takes the two detectors to detect the same sonic impulse, is equivalent to the time it takes the sonic impulse to travel the same distance through the adjacent formation as the fixed spacing between the detectors 21 and 22.

Figure 2:
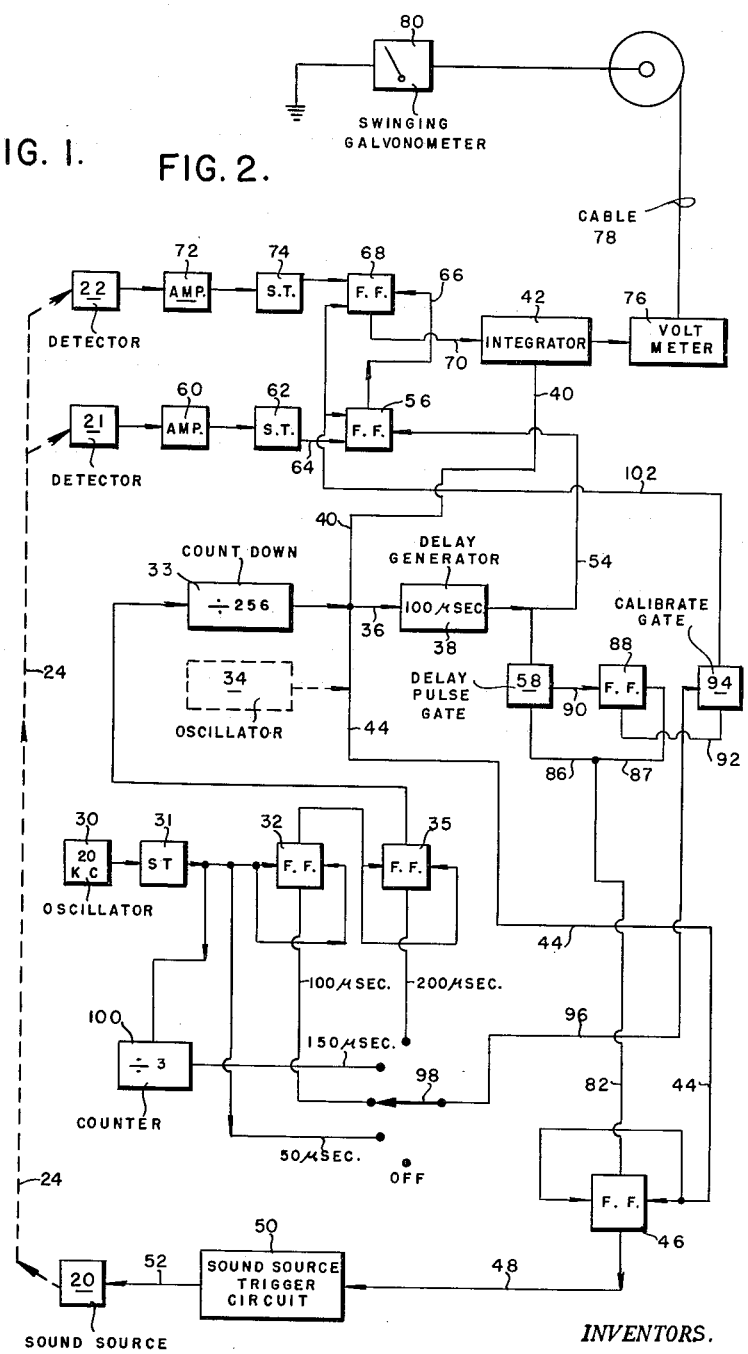
FIG. 2 is an electrical circuit block diagram of our new logging tool and illustrating the method used.

FIG. 2 is a block diagram of our new continuous calibration seismic velocity logger. A 20 c.p.s. keying signal is obtained by the countdown chain from the 20 kc. oscillator 30 which may be a crystal oscillator, feeding a Schmitt trigger 31 and flip-flops 32 and 35 arranged as binary counters, followed by an unbroken countdown chain 33 which provides a division of 256. In the alternative, a separate 20 c.p.s. signal may be supplied by an oscillator such as indicated by the broken lines 34.

Pulses from the countdown 33 are fed through line 36 to a delay generator 38. The pulses from the countdown 33 are also fed through lines 40 and 44 to an integrator 42 and a flip-flop arrangement 46, respectively.

Assume that a calibration sequence has just been completed and the system is now measuring the sonic time difference $\Delta t$. The 20 c.p.s. signal from the countdown 33 emits a pulse of the proper polarity coincident with time: $t=0$. This pulse is fed through line 40 to remove a short from a relay on a timing capacitor forming a part of the integrator 42 and leaves the capacitor ready to be charged by the $\Delta t$ signal.

The same pulse is fed through line 36 to the delay generator 38 and through line 44 to the flip-flop 46. Flip-flop 46 is binary connected and is arranged so that every alternate pulse fed through line 44 to flip-flop 46 changes the state of the flip-flop 46 such that a positive pulse is obtained from the flip-flop 46 and fed through line 48 to the sound source trigger circuit 50. The sound source trigger circuit 50 is actuated by the positive pulse to feed a signal to the sound source 20 through line 52. Sound source 20 thus emits a pulse every 100 milliseconds.

After a predetermined amount of delay, say 100 microseconds, a pulse is fed through line 54 to the flip-flop 56. The delay is required to "hold-off" the timing circuits during the period of high electrical noise associated with the triggering of the sound source 20. During the velocity measurement sequence, the gate 58 is closed so that the pulse from delay generator 38 is not fed therethrough.

The sonic pulse emitted from sound source 20 travels through the borehole wall as indicated by broken line 24 and arrives at detector 21, is amplified by amplifier 60 and the leading edge is formed to a sharp trigger by Schmitt trigger 62. The sharp trigger from Schmitt trigger 62 is applied to the flip-flop 56 through line 64. When a pulse is fed through line 64 to flip-flop 56, a pulse is fed from the flip-flop 56 through the line 66 to the flip-flop 68. This pulse sets the flip-flop 68 into a condition such that its output becomes more positive. The more positive output signal is fed through line 70 to the integrator 42.

At some time after the sonic pulse is detected by detector 21, the same sonic pulse arrives at the detector 22, is amplified by amplifier 72, the leading edge shaped into a trigger by Schmitt trigger 74 which in turn triggers the flip-flop 68 causing the positive output signal through line 70 to return to its lower state.

The width of the positive pulse obtained from the flip-flop 68 is proportional to the sonic travel time between detectors 21 and 22. The positive pulse is held constant in amplitude so that it may be integrated by integrator 42 and a voltage across a capacitor developed which is read by the voltmeter 76. The voltmeter 76 in turn transmits a current through the cable 78 to the surface galvanometer 80. This current is proportional to the travel time.

When the signal from countdown 33 changes polarity 25 milliseconds after $t=0$, the signal is fed through line 40 to the integrator 42. This signal operates a relay to reset the integrator and the output signal goes to 0. The sonic $\Delta t$ portion of the timing cycle is then complete.

When the signal from the countdown 33 again becomes of the proper polarity 50 milliseconds after $t=0$, this pulse is fed through line 44 to the flip-flop 46. The flip-flop 46, being binary connected, is triggered to the reverse state so that the output signal through line 48 is negative. The sound source trigger 50 is triggered only by a positive signal. Since the output signal through line 48 is negative, the trigger 50 cannot be triggered at this time.

A positive signal output is fed from flip-flop 46 through line 82 and line 86 to the gate 58. This positive signal opens the gate 58. This signal is also fed through line 87 to the delayed flip-flop 88.

The delay generator 38 generates a pulse 100 microseconds after the input to it. This pulse is fed through line 54 to the flip-flop 56. Thus, flip-flop 56 is reset by the pulse from the delay generator 38. The pulse from delay generator 38 is also fed through the now opened gate 58 through line 90 to the flip-flop 88. Flip-flop 88 is thus triggered providing an output signal through line 92 to the calibrate pulse gate 94. The positive signal from the flip-flop 88 fed to the calibrate pulse gate 94 opens the gate 94.

Calibrate signals are continuously fed through line 96 to the calibrate pulse gate 94. However, as long as gate 94 is closed, these calibrate pulses are not passed therethrough. The calibrate signals can be obtained by means of a selector switch 98. The calibrate signals are sent from the Schmitt trigger 31 for a 50 microseconds spacing. Likewise, for 100 microseconds spacing, these signals are obtained from flip-flop 32. To obtain 150 microseconds spacing, the signals are obtained from the ÷3 counter 100. To obtain a 200 microseconds spacing, the calibrate signals are obtained from the flip-flop 35.

With the calibrate pulse gate 94 open, the calibrate signals can be fed through line 96 and gate 94 through line 102 to the flip-flops 56 and 68. The electrical structure of the calibrate pulse gate 94 is such that the output from the calibrate pulse gate is shaped so that the first calibrate pulse passing through the gate is too small to trigger the flip-flop 56. The reason for not triggering the flip-flop 56 with the first calibrate pulse is to insure that the delayed 50 milliseconds pulse does not arrive at flip-flop 56 coincident with a calibrate pulse, thus upsetting the timing action. The next calibrate pulse passes through the gate 94 and is fed through line 102 to the flip-flop 56. A signal is fed through line 66 to the flip-flop 68 to provide a positive pulse through line 70 to the integrator 42. The next calibrate pulse is then fed through line 102 to trigger the flip-flop 68 off and the positive output pulse through line 70 is terminated. The duration of the positive pulse is then equal to the interval between successive calibrate pulses. The calibrate $\Delta t$ pulse is integrated by integrator 42, measured by voltmeter 76, and transmitted to the surface in the same manner as the sonic $\Delta t$ is transmitted.

When the signal from countdown 33 again changes polarity 75 milliseconds after $t=0$, integrator 42 is reset to zero and the calibrate cycle is completed. The sequence of events is then repeated for the sonic measurement as previously described. The next pulse from countdown 33 after the calibration sequence has been completed is fed to flip-flop 46. This reverses the state of the signal from output 82 which is fed to the gate 58. This output signal being negative, the gate 58 is closed. This signal also reverses the output from flip-flop 88 to provide a negative output signal from flip-flop 88 thereby closing the calibrate pulse gate. The sonic $\Delta t$ is then measured in the manner as previously described.

Figure 5:
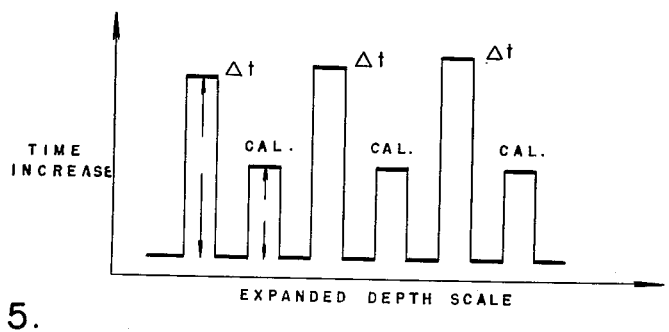
FIG. 5 is a typical record on an expanded depth scale, illustrating the types of records obtained using our new method and apparatus.

FIG. 5 shows on an expanded depth scale the type of record obtained by this new method and system. As can be seen from FIG. 5, alternate records of the sonic $\Delta t$ and calibrate $\Delta t$ are recorded. If the calibrated $\Delta t$ becomes different, the field operator is immediately made conscience of a possible malfunction or error in the operation of the system and can make adjustments.

Figure 3:
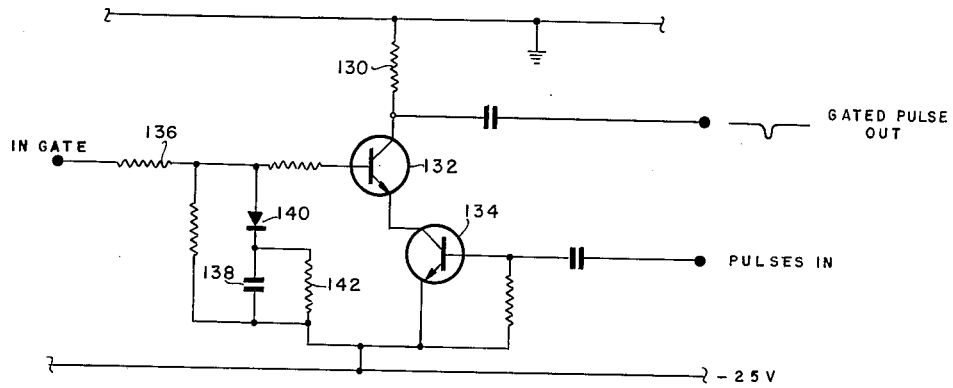
FIG. 3 is an electrical circuit diagram of the calibrate pulse gate used in the system.

FIG. 3 is an electrical circuit diagram of the calibrate gate pulse 94 of FIG. 2. The calibrate gate pulse includes a resistor 130 connected to the collector of an NPN type transistor 132. The emitter of transistor 132 is connected to the collector of a second NPN type transistor 134. Thus, the resistor 130 and transistors 132 and 134 are connected in series across the voltage source. In order for current to flow through resistor 130, it is necessary that both of the transistors 132 and 134 be forward biased. This requires the application of a positive signal to the base of transistor 132 and a positive signal to the base of transistor 134. If the positive signals are not applied to both transistor bases, a current will not flow through resistor 130.

In operation, a continuous chain of calibration pulses of positive polarity is applied to the terminal marked "pulses in." A 10 c.p.s. flip-flop signal is applied to the terminal marked "in gate." When the gate signal is negative, the transistor 132 is cut off and no collector current is available for transistor 134. Therefore, during one-half of each one-tenth second period, no calibration pulses come out of the output terminal.

When the gate signal goes positive, the base of transistor 132 begins to rise in voltage, but this rise is retarded by the time constant imposed by the input resistor 136 and the capacitor 138. Therefore, even though the input signal has a sharp rise time, several hundred microseconds are required for the transistor base to fully rise. During the rise, the current through resistor 130 increases thus decreasing the output voltage. However, the inverted and amplified input pulses do not reach full amplitude until the transistor 132 is driven to saturation. The first one or two pulses after application of the input gate signal are therefore too small to actuate a flip-flop.

When the gate signal goes negative in order to cut off the calibrate pulses, the diode 140 interposed between the capacitor 138 and the transistor base disconnects these two elements, allowing the base to follow the input signal without delay. A resistor 142 is connected across the capacitor 138 to allow it to discharge before application of the next positive gate.

Figure 4:
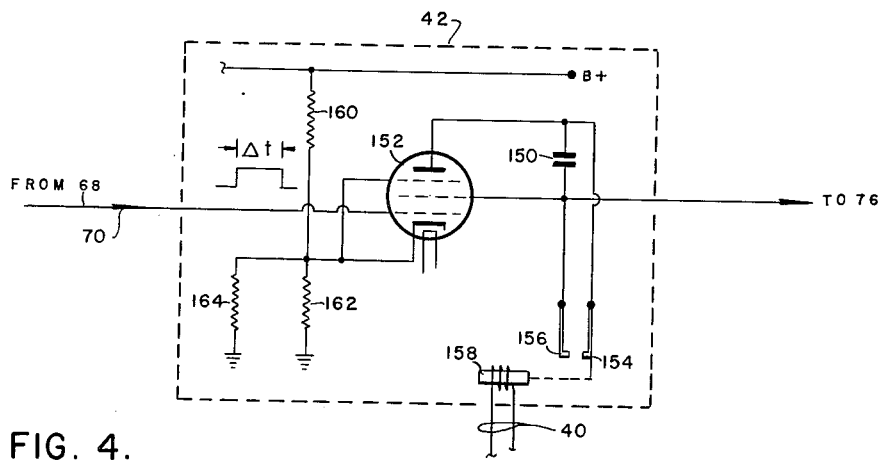
FIG. 4 is an electrical circuit diagram of an integrator.

A portion of the electrical circuit of integrator 42 of FIG. 2 is shown in FIG. 4. An interval timing capacitor 150 is connected to the anode and to the screen grid of pentode 152. The normally open contacts 154 and 156 of a relay 158 are connected in a manner such as to short circuit, and thereby discharge capacitor 150 when these contacts are closed.

The cathode of pentode 152 is biased at a fixed potential above ground by connection to an intermediate point upon the voltage divider formed by resistors 160 and 162 connected in series across the source of fixed D.C. potentials. The cathode biased potential thus provided is adjusted to such a value that anode current flow through pentode 152 is cut off at all times except during the period when the positively polarized rectangular wave arriving from the flip-flop 68 (FIG. 2) is applied to the control grid of pentode 152 across a grid resistor 164. During this period, current flow through pentode 152 is substantially constant and is employed to charge the interval timing capacitor 150.

When a positive pulse is applied to line 40, the relay 158 closes the contacts 154 and 156. This discharges the stored energy on the interval timing capacitor 150. When a negative pulse is applied to line 40, the relay 158 opens contacts 154 and 156 and thereafter a charge is stored in the capacitor 150 which is proportional to the time difference $\Delta t$ for either the sonic log or the calibrate log depending upon which sequence is being measured.

To review the operation of the system briefly, at time $t=0$, a pulse is fed from countdown 33 to the flip-flop 46 to generate a signal from sound source 20. This same pulse is fed through the delay generator 38 to the flip-flop 56. The sound is detected by detector 21 and then by detector 22 and the signal stored in capacitor 150 of integrator 42 is proportional to the time difference $\Delta t$. During this time, the contacts 154 and 156 of the integrator are open so that the capacitor 150 can be charged. The pulse from countdown 33 cannot pass through gate 58 because it is closed. Also, the calibrate signal cannot pass through calibrate pulse gate 94 because it is closed.

When the signal from countdown 33 changes polarity, it is fed through line 40 to the relay 158 to close contacts 154 and 156 and discharge the capacitor 150. The discharged amount is measured by voltmeter 76 and recorded by the swinging galvanometer 80. This pulse has no effect on the flip-flop 46 or the flip-flop 56 since they are actuated only by a pulse of the opposite polarity.

The next pulse of proper polarity is fed to the flip-flop 46 and the integrator 42 to open the contacts 154 and 156. The resulting signal from flip-flop 46 opens the gate 58. The gate 94 is also opened thus permitting the calibrate pulses to be fed through gate 94 and line 102 to the flip-flops 56 and 68. The integrator 42 integrates the calibrate signal. The stored energy in the capacitor 150 is measured and recorded.

We claim:

1. In a velocity logger wherein a calibration signal timing sequence is time-shared with a velocity logging sequence: an electrical circuitry for continuously and automatically performing repeated cycles of operation, each cycle including a calibration sequence and a velocity logging sequence, said circuitry including a source of calibrate pulses, means responsive to a calibrate pulse to initiate the feeding of a signal of constant amplitude to a signal storage means, and responsive to another calibrate pulse to terminate the feeding of the signal to the signal storage means, a recorder for recording the resulting storage signal, and a gate automatically operated to prevent the calibrate pulses from reaching the calibrate pulse responsive means during the velocity logging sequence.

2. In a velocity logger adapted to be lowered into a borehole and wherein a calibration signal timing sequence is continuously and automatically time-shared with a velocity logging sequence during measurements of the velocity of sonic pulses through subsurface formations between at least two points within the subsurface formations: a sound source; a sound detecting arrangement spaced from said sound source; a triggering circuit connected to said sound source for actuating said sound source; timing means connected to said sound detecting arrangement; electrical circuitry interconnecting said triggering circuit and said timing means, said electrical circuitry including a source of calibrate pulses, and a gate for automatically preventing the calibrate pulses from reaching the timing means during the velocity logging sequence, said electrical circuitry also including means for automatically preventing the actuation of the triggering circuit during the calibration signal timing sequence; and recording means electrically connected to said timing means for recording signals indicative of the time periods measured by said timing means.

3. A logging tool comprising: a sound source; means for continuously generating a first series of pulses and a second series of pulses, said second series of pulses serving as calibration pulses; a circuit including a binary connected flip-flop for controlling the emission of sound from said sound source, said flip-flop being adapted to receive said first series of pulses; a calibration signal timing means; a circuit including a gate for controlling the passage of said calibration pulses to said calibration signal timing means; and means responsive to said flip-flop for controlling the position of said gate, the polarities of said first series of pulses being controlled so as to continuously and automatically cause repeated cycles of operation, each cycle including the emission of sound from the sound source, and the opening of the gate to permit the passage of calibrate pulses to the timing means.

References Cited in the file of this patent

UNITED STATES PATENTS 2,931,455     Loofbourrow             Apr. 5, 1960